(12) United States Patent
Mehta et al.

(10) Patent No.: US 8,782,712 B2
(45) Date of Patent: Jul. 15, 2014

(54) METHOD AND SYSTEM FOR CREATING A MEDIA PLAYLIST

(75) Inventors: Japan A. Mehta, Irving, TX (US); Enrique Ruiz-Velasco, Flower Mound, TX (US); Shafiq Kassam, Lewisville, TX (US); Laxmi M. Patel, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 717 days.

(21) Appl. No.: 12/342,960

(22) Filed: Dec. 23, 2008

(65) Prior Publication Data

US 2010/0162324 A1    Jun. 24, 2010

(51) Int. Cl.
*G06F 3/00* (2006.01)
*H04N 7/18* (2006.01)

(52) U.S. Cl.
USPC ............. 725/61; 725/59; 725/60; 725/80

(58) Field of Classification Search
None
See application file for complete search history.

(56) References Cited

U.S. PATENT DOCUMENTS

| 6,813,775 | B1* | 11/2004 | Finseth et al. .................. 725/46 |
| 2005/0097624 | A1* | 5/2005 | Salo et al. ..................... 725/136 |
| 2005/0246746 | A1* | 11/2005 | Yui et al. ........................ 725/80 |
| 2006/0270395 | A1* | 11/2006 | Dhawan et al. .............. 455/418 |
| 2008/0133715 | A1* | 6/2008 | Yoneda et al. ............... 709/219 |
| 2008/0168505 | A1* | 7/2008 | Saito et al. ..................... 725/61 |
| 2009/0119715 | A1* | 5/2009 | Schwesinger et al. ......... 725/58 |

* cited by examiner

*Primary Examiner* — Brian T Pendleton
*Assistant Examiner* — Jean D Saint Cyr

(57) ABSTRACT

An approach is provided for the creation of a media playlist for managing and scheduling content from a variety of media sources including broadcast and online sources. The playlist creation process facilitates efficient resolution of media scheduling conflicts by automatically identifying conflicts and generating alternate playlists to overcome them. The approach also enables a user to share the media playlist seamlessly with other devices and users.

25 Claims, 13 Drawing Sheets

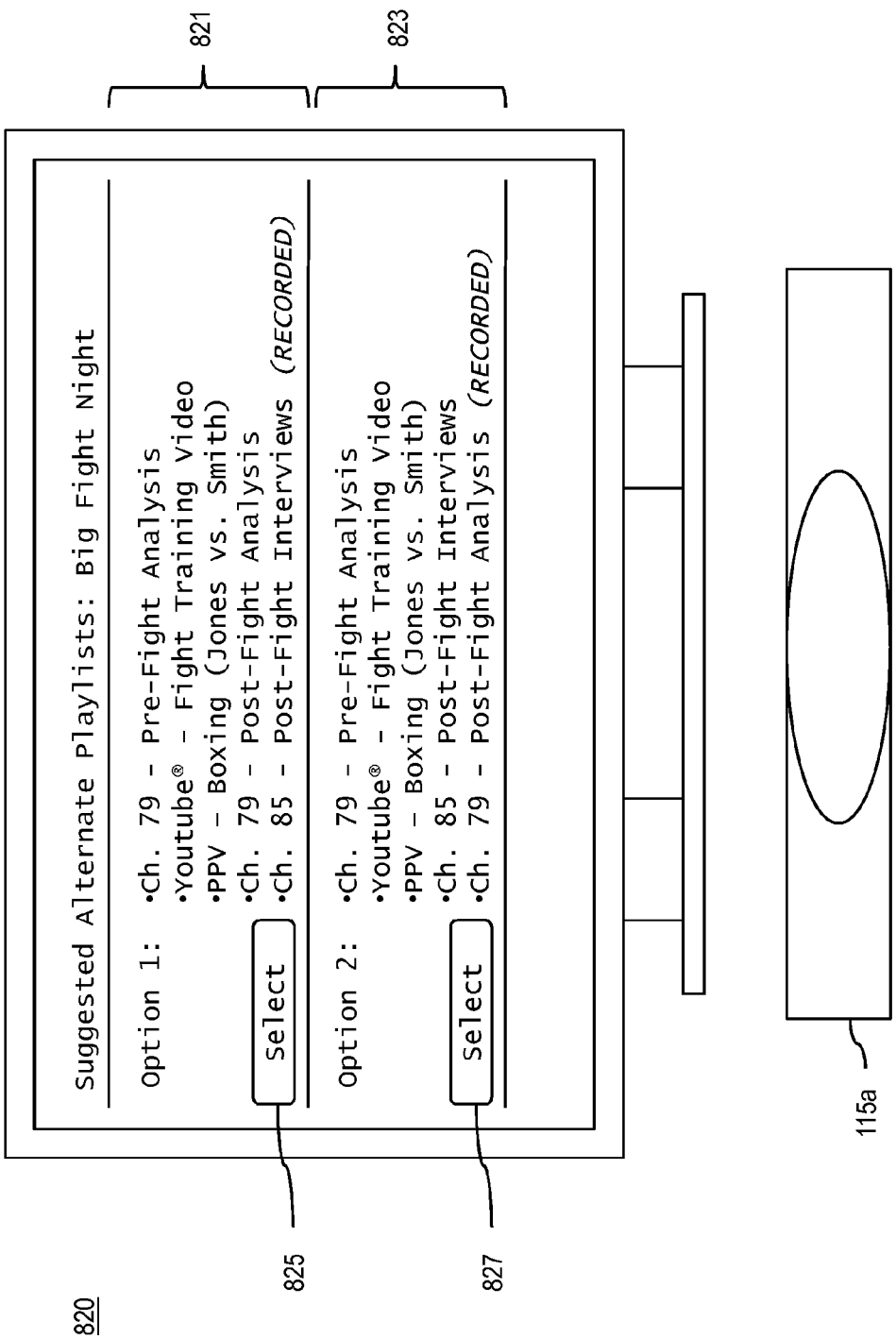

840

Suggested Alternate Playlists: Big Fight Night

Option 3: • Ch. 79 – Pre-Fight Analysis
• Youtube® – Fight Training Video
• PPV – Boxing (Jones vs. Smith)
• Ch. 79 – Post-Fight Analysis
• Ch. 85 – Post-Fight Interviews *(View Online)*

841

Select

843

115a

US 8,782,712 B2

METHOD AND SYSTEM FOR CREATING A MEDIA PLAYLIST

BACKGROUND INFORMATION

Today, media devices, such as set-top boxes (STB), are quickly becoming the central hub for accessing entertainment and communication services. Many consumers are finding that these devices enable ubiquitous access to a wide variety of media content (e.g., broadcast television programs, on-demand programming, pay-per-view programming, Internet-based content, audio content, and even graphical or image content). Moreover, it is recognized that advances in technology, services, and affordability are accelerating the integration of these devices into modern lifestyles and leading to explosive growth in the amount and diversity of media available to consumers. However, the availability of such an extensive library of media has also made it much more difficult for a consumer to identify, schedule, and view content of specific interest to the consumer. Consequently, a consumer may easily miss viewing a favorite program or show. In particular, scheduling conflicts become inevitable and more difficult to resolve across disparate content sources.

Therefore, there is a need for an approach that creates a media playlist to assist in managing and scheduling media content.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 8A-8E are diagrams of a user interface utilized in the process of FIG. 7, according to an exemplary embodiment.

DESCRIPTION OF THE PREFERRED EMBODIMENT

A preferred apparatus, method, and system for creating a media playlist are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a set-top box (STB), it is contemplated that these embodiments have applicability to any device capable of processing audio-video (AV) signals for presentation to a user, such as a home communication terminal (HCT), a digital home communication terminal (DHCT), a stand-alone personal video recorder (PVR), a television set, a digital video disc (DVD) player, a video-enabled phone, an AV-enabled personal digital assistant (PDA), and/or a personal computer (PC), as well as other like technologies and customer premises equipment (CPE).

Figure 1:
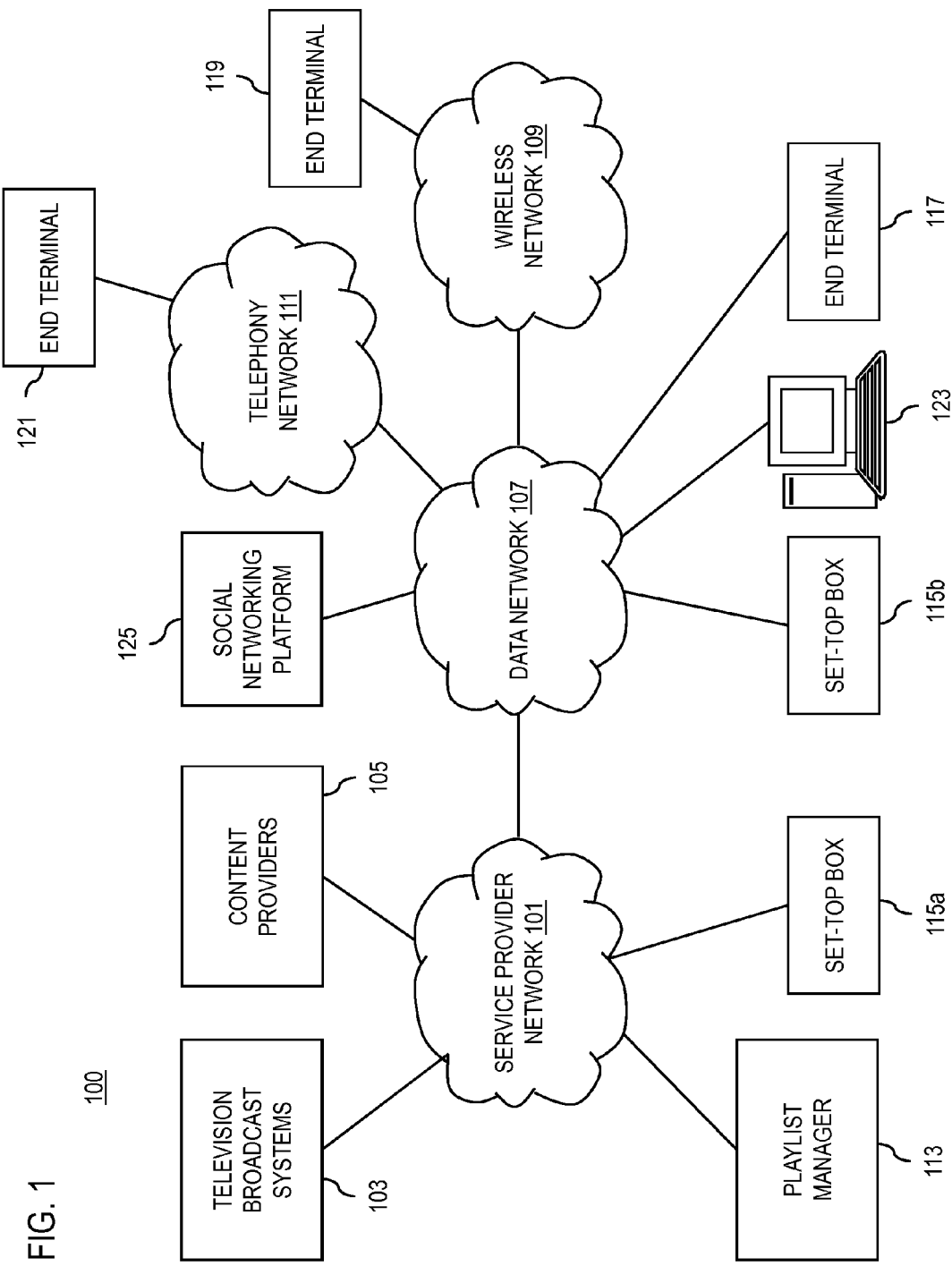
FIG. 1 is a diagram of a system capable of creating a media playlist, according to an exemplary embodiment.

FIG. 1 is a diagram of a system capable of creating a media playlist, according to an exemplary embodiment. For the purposes of illustration, a system 100 for creating a media playlist is described with respect to a service provider network 101 including one or more media service providers such as television broadcast systems 103 and content providers 105. It is contemplated that system 100 may embody many forms and include multiple and/or alternative components and facilities. As used herein, the terms STB, media-based device, and user equipment are interchangeable. Furthermore, media content is contemplated broadly to include a wide range of media. Media content can include any audio-video content (e.g., broadcast television programs, digital video recorder (DVR) content, on-demand programs, pay-per-view programs, IPTV (Internet Protocol Television) feeds, DVD related content, audio content, graphical or image content, etc.), pre-recorded media content, data communication services content (e.g., commercials, advertisements, videos, movies, etc.), Internet-based content (e.g., streamed video), and/or any other equivalent media form.

In addition, system 100 includes a data network 107, a wireless network 109, and a telephony network 111. It is contemplated that the data network 107 may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network 109 may be, for example, a cellular network and may employ various technologies including code division multiple access (CDMA), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, wireless fidelity (WiFi), satellite, and the like. These networks 107-111, in conjunction with service provider network 101, can support various media sessions (e.g., television broadcasts, on-demand videos, etc.).

The playlist manager platform 113 introduces the capability to integrate broadcast and online media content in a single media playlist, resolve scheduling conflicts in the playlist, and share the playlist with other users and devices. As shown in FIG. 1, the platform 113 resides on the network side. In addition (or alternatively), the playlist manager platform 113 may reside within a customer premises equipment (CPE) (not shown) or the media device itself. Specifically, the playlist manager platform 113 receives a selection information regarding media content from a user, determines whether a scheduling conflict exists for the media content, and creates a media playlist for the user based on the selection information and the determination. If there is a conflict, the playlist manager platform 113 may alert the user of the conflict and suggest alternate media playlists that incorporate the requested media and overcomes the conflict. The user may then select a media playlist from among the suggestions for the playlist manager platform 113 to create. Once a media playlist is created, the playlist manager platform 113 can synchronize the playlist among a set of media devices and/or transmit the playlist to other users. In addition, the playlist manager platform 113 can set the playlist to an away mode which causes the playlist manager platform 113 to automatically initiate the recording of any broadcast content in the playlist. In this way, the user can play the entire playlist at any time upon the user's return.

As discussed above, users have access to a vast library of broadcast and online content via media devices such as STBs 115. The size of the available media library can potentially overwhelm the user and cause the user the miss programs and shows. This problem is exacerbated by the traditional process of selecting media content which involves selecting and viewing only one program at a time. For example, a user begins by selecting a program to view. After the selected program finishes, the user then has to manually select another program, and so on for each subsequent program. This manual process may cause users to miss shows they would have otherwise wanted to watch because the desired programs often are shown on different channels or entirely different media sources altogether (e.g., broadcast television vs. streaming Internet video). Often times, a user may become engrossed in a show on one content source and forget to switch to the show the user actually wanted to see. The playlist manager platform 113 addresses this problem by enabling a user to create a media playlist for scheduling content on the media device.

For example, a user may create a playlist that spans an entire evening from 7:00 pm to 11:00 pm. At the 7:00 pm slot in the playlist, the user adds the national evening news on one channel; at 7:30 pm, the user adds a game show on a second channel; at 8:00 pm, the user adds a movie on a third channel; and at 10:00 pm, the user adds an investigative news program on a fourth channel. The user begins playback of the playlist at 7:00 pm, and the media device automatically switches to the desired programs at the correct times.

As seen in FIG. 1, the playlist manager platform 113 has connectivity to STBs 115a and 115b via service provider network 101 and data network 107 respectively. The platform 113 also has connectivity to end terminal 117 via data network 107, end terminal 119 via wireless network 109, and end terminal 121 via telephony network 111. Any of the devices (i.e., STBs 115a-115b and end terminals 117-121) may provide access to the services and functions of the playlist manager platform 113.

For example, end terminal 117 may be any computing device (e.g., Personal Digital Assistant (PDA), personal computer, laptop, etc.) or communication device (e.g., a video conferencing terminal, a digital home communication terminal (DHCT) capable of providing access to the services and functions of the playlist manager platform 113. End terminal 119 may be any media-capable mobile device (e.g., a mobile handset, video-capable cellular telephone, etc.). Furthermore, end terminal 121 may, for instance, include a home communication terminal (HCT) or any other telephonic device capable of accessing the services and functions of the playlist manager platform 113.

The data network 107 additionally permits a host 123 to access playlist manager platform 113 services and functions via a graphical user interface (GUI) such as a browser application or any web-based application for STBs 115a-115b and/or end terminals 117-121. Under one scenario, it is contemplated that a user can configure playlist manager services, functions, and preferences for STBs 115a-115b and/or end terminals 117-121 via a web browser.

STBs 115a-115b and/or end terminals 117-121 can communicate using data network 107, wireless network 109, and/or telephony network 111. These systems can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, Long Term Evolution (LTE) networks, wireless fidelity (WiFi) networks, other wireless networks (e.g., 3G wireless broadband networks, mobile television networks, radio networks, etc.), terrestrial broadcasting networks, provider specific networks (e.g., a Verizon® FiOS network, a TIVO™ network, etc), and the like. Such networks may also utilize any suitable protocol supportive of data communications, e.g., transmission control protocol (TCP), Internet protocol (IP), user datagram protocol (UDP), hypertext markup language (HTML), dynamic HTML (DHTML), file transfer protocol (FTP), telnet, hypertext transfer protocol (HTTP), asynchronous transfer mode (ATM), wireless application protocol (WAP), socket connection (e.g., secure sockets layer (SSL)), Ethernet, frame relay, and the like, to connect STBs 115a-115b and/or end terminals 117-121 to the playlist manager platform 113 and to various sources of media content.

The STBs 115a-115b and end terminals 117-121 can also be associated as one or more communities. Such communities can be established by a social network application/platform 125, which permits users with common interests to communicate and exchange information. Specifically, users of these devices 115-121 can organize into groups of users to share their generated playlists. By way of example, the social networking platform 125 can implemented as a website (e.g., FACEBOOK® and MYSPACE®), and accessed by a browser application.

Although depicted in FIG. 1 as separate networks, data network 107, wireless network 109, and/or telephony network 111 may be completely or partially contained within service provider network 101. For example, service provider network 101 may include facilities to provide for transport of packet-based, wireless, and/or telephony communications. As such, exemplary embodiments of playlist manager platform 113 may, for instance, comprise hypertext markup language (HTML) user interfaces or JAVA™ applets accessed via world-wide-web pages. These interfaces are particularly useful in extending system 100 functionality to devices having limited resources (e.g., PDAs, handsets, thin-clients, etc.), as well as providing scalable solutions to varied devices without necessitating intensive high-end costs associated with independent design, tooling, and manufacturing.

In particular embodiments, service provider network 101 can include an IPTV system (not shown) configured to support the transmission of television video programs from television broadcast systems 103 as well as other video content, such as media content from the various third-party content providers 105 utilizing IP. That is, the IPTV system may deliver signals and/or video content in the form of IP packets. Further, the transmission network (e.g., service provider network 101) may optionally support end-to-end data encryption in conjunction with the delivery of video content.

In this manner, the use of IP permits media content to be integrated with broadband Internet services, and thus, share common connections to a user site. Also, IP packets can be more readily manipulated, and therefore, provide users with greater flexibility in terms of control, as well as offer superior methods for increasing the availability of media content. Delivery of media content, by way of example, may be through a multicast from the IPTV system to the STBs 115a-115b and end terminals 117-121. Any individual STB or end terminal may tune to a particular media source by simply joining a multicast (or unicast) of the video content utilizing an IP group membership protocol (IGMP). For instance, the IGMP v2 protocol may be employed for joining STBs to new multicast (or unicast) groups. Such a manner of delivery avoids the need for expensive tuners to view media content, such as television broadcasts; however, other delivery methods, such as directly modulated carriers (e.g., national television systems committee (NTSC), advanced television systems committee (ATSC), quadrature amplitude modulation (QAM)), may still be utilized. It is noted that conventional delivery methods may also be implemented and combined with the advanced methods of system 100. Further, the media content may be provided to various IP-enabled devices, such as the computing, telephony, and mobile apparatuses previously delineated.

While system 100 is illustrated in FIG. 1, the exemplary components are not intended to be limiting, and indeed, additional or alternative components and/or implementations may be utilized.

In one embodiment, the playlist service is a managed service, whereby a service provider operates the playlist manager platform 113 to serve one or more subscribers.

Figure 2:
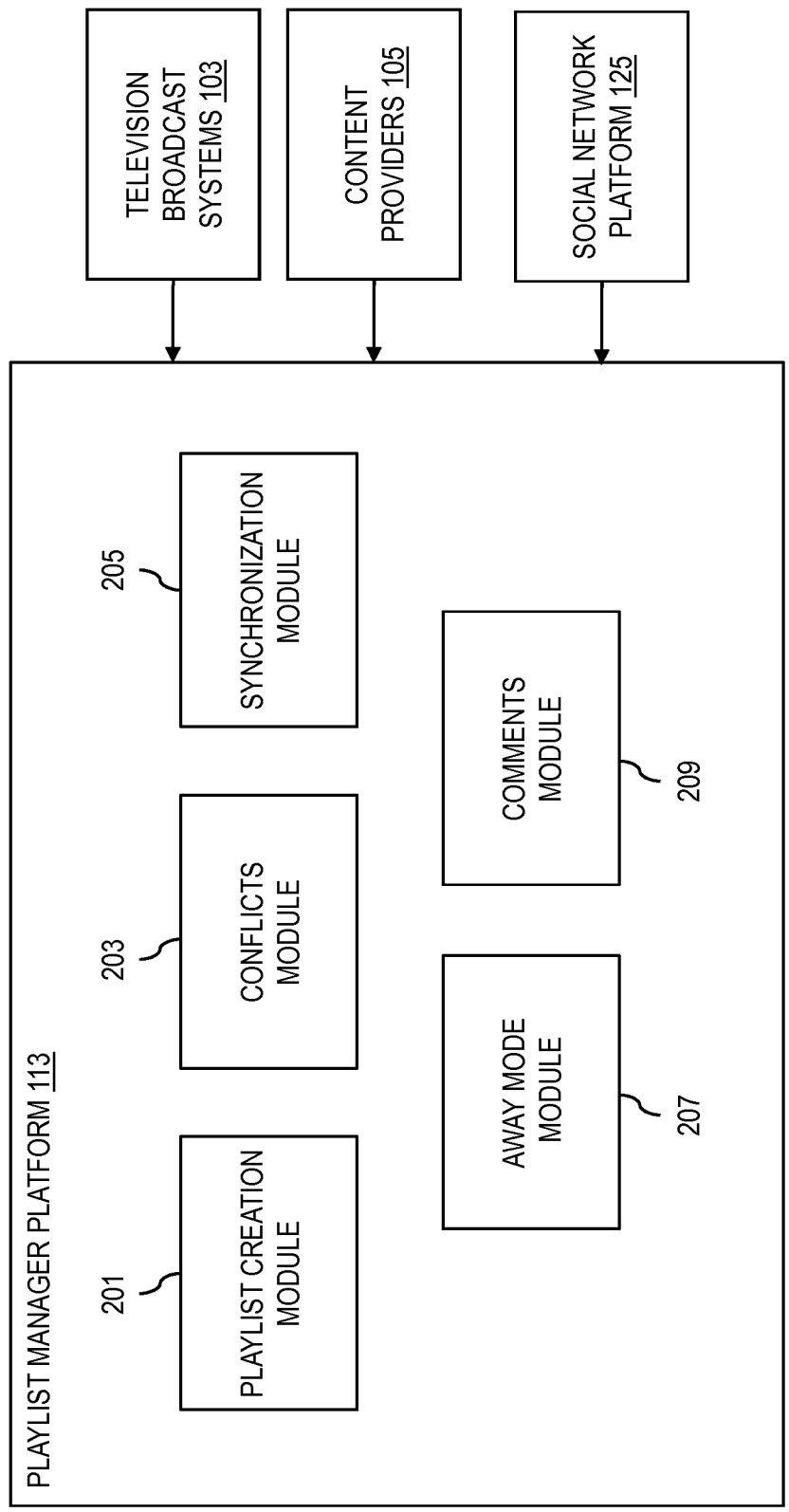
FIG. 2 is a diagram of the components of a playlist manager platform, according to an exemplary embodiment.

FIG. 2 is a diagram of the components of a playlist manager platform, according to an exemplary embodiment. By way of example, the playlist manager platform 113 may include one or more of the modules to create a media playlist. The platform 113 may also have connectivity to television broadcast systems 103 and content providers 105 to access information regarding media content. Within platform 113, a playlist creation module 201 interacts with a conflicts module 203 to create a media playlist based on user input. Conflicts module 203 may, for instance, determine the broadcast times of media content in the playlist by accessing information available from television broadcast systems 103 and content providers 103, identify any conflicts or overlaps, suggest alternate playlists to overcome any conflicts, and transmit the suggested playlists to playlist creation module 201. In exemplary embodiments, conflicts module 203 may suggest alternate playlists that include options for recording conflicting media for viewing later in the playlist, recommending an alternate viewing time for the conflicting media, or suggesting an alternate viewing medium for the conflicting media content (e.g., suggesting the viewing of an on-demand showing of a broadcast program). Playlist creation module 201 may then present the suggested playlists to the user and create the playlist selected by the user.

After a playlist is created, synchronization module 205 may automatically synchronize the playlist among a set of media devices designated by the user. In exemplary embodiments, synchronization module 205 may also be configured to automatically update the user's progress through a playlist among the set of devices. In this way, synchronization module 205 enables a user to begin playback of a playlist on one device and seamlessly continue playback on another device.

Away mode module 207 may be configured to set a media playlist to an away mode. In away mode, module 207 initiates the recording of any broadcast content included in the playlist. In this way, the broadcast content in the playlist is made available to the user for later viewing. For instance, in the example discussed with respect to FIG. 1, the user may set the playlist scheduled from 7:00 pm to 11:00 pm in away mode. Instead of merely changing to the designated program at the designated times according to the playlist, the module 207 will initiate the media device (e.g., STBs 115a-115b, end terminals 117-121) to record all broadcast programs in the playlist. When the user begins playback of the playlist at a later time, the user will have access to the recorded broadcast content.

Playlist manager platform 113 also includes a comments module 209 that may be configured to transmit a media playlist to one or more other users and exchange information (e.g., comments, suggestions, and other similar interactions) regarding the playlist among the other users. In other words, comments module 209 enables the sharing of a playlist in a social networking setting. This enables other users to replicate the transmitted playlist and provide feedback to the user who created the playlist. In one embodiment, comments module 209 also provides interoperability with one or more communities contained in external online social networks via the social networking platform 125. These communities are external in a sense that they are not controlled by the service provider, and thus, are not part of the service provider's communication system. Interoperability with external online social networks enables a user to share playlists across networks.

Figure 3:
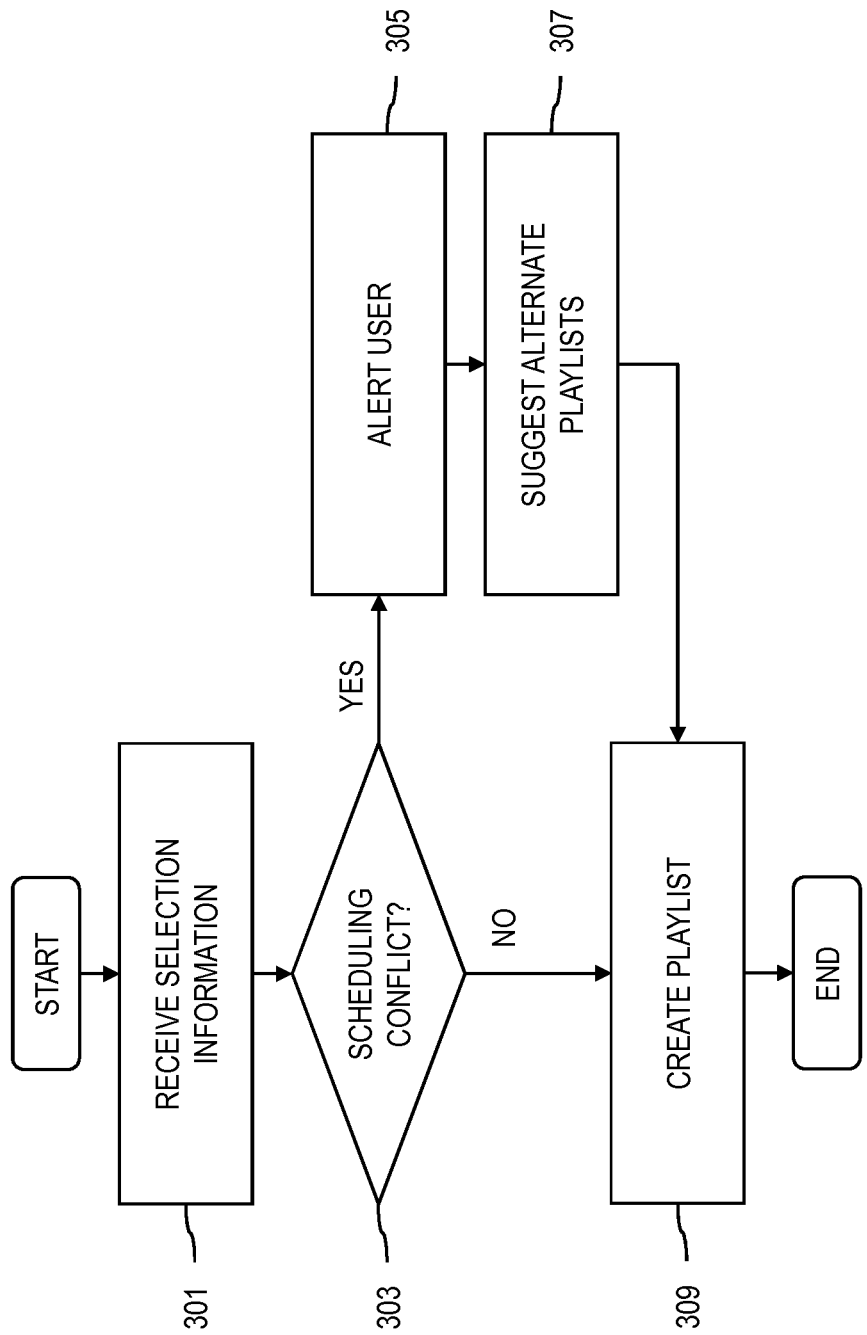
FIG. 3 is a flowchart of a process for creating a media playlist and resolving scheduling conflicts, according to an exemplary embodiment.

FIG. 3 is a flowchart of a process for creating a media playlist, according to an exemplary embodiment. In step 301, the playlist manager platform 113 receives selection information regarding media content for creating a media playlist on a device such as a computing device, mobile device, or STB. This input may, for example, include the name of the playlist and a listing of specific media content to include in the list. Additionally, the media content may come from any number of media sources available in system 100. In exemplary embodiments, the user may specify media content for a playlist by any number of input methods including direct entry of the media content title or other identifier (e.g., program number, time slot, key word search, etc.). Another input method enables a user to specify content for a playlist by selecting the content from an online programming guide, program listing, or similar media content index.

After receiving the input, the playlist manager platform 113 determines whether a scheduling conflict exists for the media content in the playlist (step 303). If there is a scheduling conflict, the playlist manager platform 113 alerts the user (step 305). Specifically, the playlist manager platform 113 may, for example, obtain media content scheduling and availability information from television broadcast systems 103 and/or content providers 105 to determine whether there is a scheduling conflict among the items in the playlist that would prevent the user from playing the playlist as requested (e.g., two or more programs in the playlist may start at the same time or the broadcast times of two or more programs overlap). The content scheduling and availability information may include media type (e.g., broadcast content, on-demand content, Internet-based content, etc.) and schedule (e.g., broadcast channel and time, available on demand, etc.). The playlist manager platform 113 may then use this information to alert the user of the conflict.

In addition to providing an alert, the playlist manager platform 113 can suggest alternate playlists to overcome the conflict (step 307). In suggesting alternate playlists, the playlist manager platform 113 may, for instance, schedule a recording of the conflicting media content for viewing later in the playlist, schedule an alternate viewing time for the conflicting media, or suggest an alternate viewing medium for the conflicting media content. For example, the playlist manager platform 103 may suggest an alternate viewing medium if the conflict involves a broadcast program that is also available on-demand or through the Internet. In this case, the platform 103 can suggest viewing the on-demand or Internet-based version of the conflicting broadcast content. This option may be particularly applicable in scenarios where the user's media device is not capable of recording. In exemplary embodiments, the specific action taken by the platform 113 to overcome a conflict depends on the nature of the media content.

For instance, the platform 113 has more flexibility in rearranging the video within the playlist to avoid conflicts if the conflicting media is an online video stream available for viewing at any time. Because the video is available online at any time, there would be no need to offer to record the program. If the conflicting media is a broadcast television program scheduled for a certain time, the platform 113 likely would not have the option to schedule an alternate viewing time for the viewing the program. Instead, the platform 113 may offer to record the broadcast for viewing at a later point in the playlist or suggest an alternate viewing medium (e.g., video-on-demand instead of broadcast) if available. The platform 113 also may have the option to reschedule whatever other media content is conflicting with the broadcast. If the conflicting media is a pay-per-view event with scheduled multiple showing times, the platform 113 may schedule an alternate viewing time for the event to avoid a conflict. If recording of the pay-per-view event is allowed by the service provider, the platform 113 may also offer to record the program for viewing later in the playlist.

After presenting suggested alternate playlists to the user, the playlist manager platform 113 may receive input from the user selecting a playlist and then creates the selected playlist (step 309). If there is no scheduling conflict, the playlist manager platform 113 creates the playlist as originally requested by the user. Once a playlist is created, the playlist manager platform 113 may perform additional functions on the playlist. These additional functions are described with respect to FIGS. 4-6.

Figure 4:
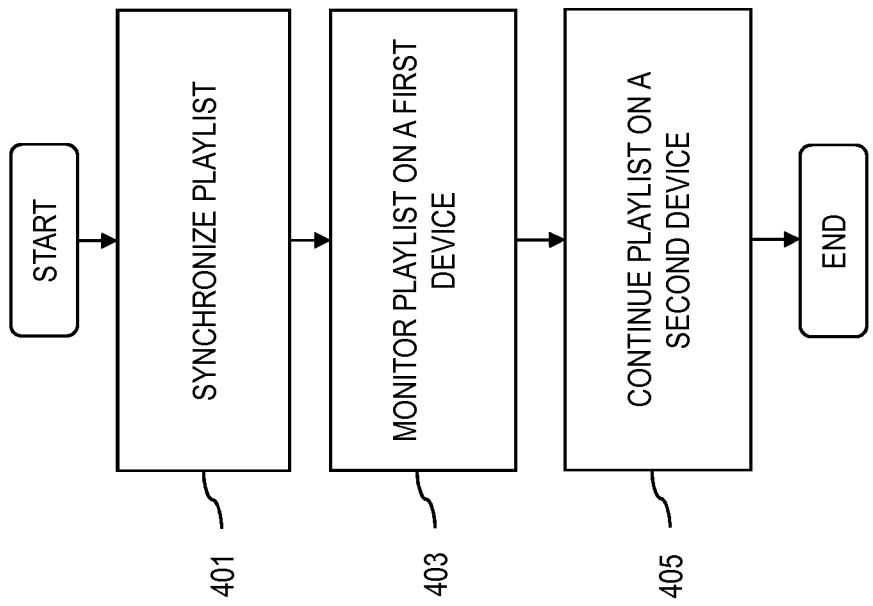
FIG. 4 is a flowchart of a process for synchronizing a media playlist among a set of devices, according to an exemplary embodiment.

FIG. 4 is a flowchart of a process for synchronizing a media playlist among a set of devices, according to an exemplary embodiment. The playlist manager platform 113 may synchronize a playlist among a set of devices (e.g., STBs 115a-115b, end terminals 117-121) by transmitting the playlist created by the user on one device to, for instance, other devices designated by the user (step 401). It is contemplated that any type of authentication process (e.g., user name and password, key access number, unique machine identifier (e.g., MAC address), biometric identifier) can be employed to ensure that the playlist is synchronized only among authorized devices. In step 403, the playlist manager platform 113 monitors and tracks the user's progress through a playlist on a first device (step 403). The playlist manager platform 113 may then periodically synchronize the user's progress among the set of devices. In this way, the playlist manager platform 113 can continue playback of the playlist on any device within the set of devices should the user pause or stop playback on a first device (step 405). For example, a user may start viewing a playlist on STB 115a, but is unable to complete the entire playlist before departing on a trip. The playlist manager synchronizes the user's playlist and current progress to, for instance, end terminal 119 (e.g., user's media-capable mobile device). This enables the user to continue viewing the playlist on the mobile device during the trip.

Figure 5:
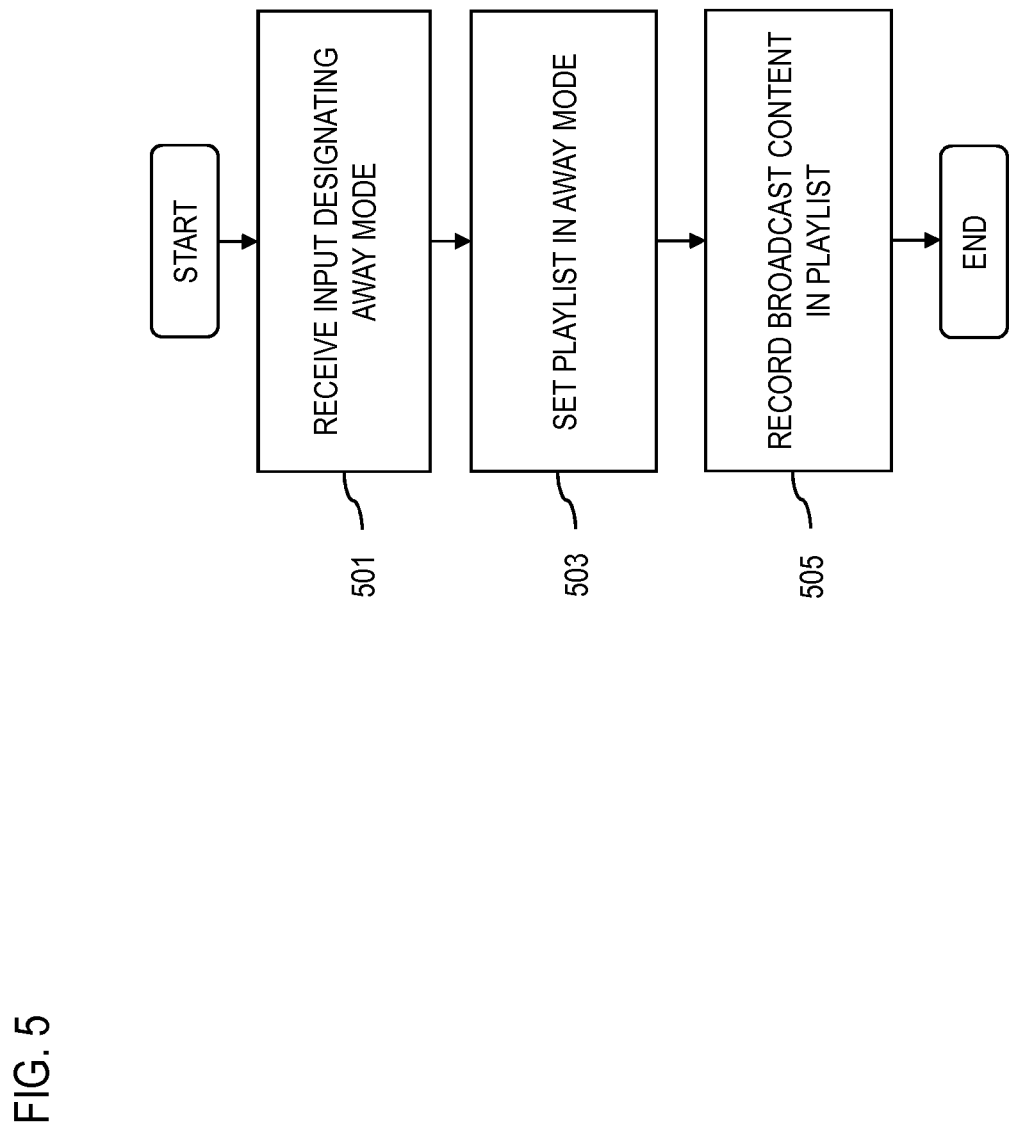
FIG. 5 is a flowchart of a process for setting a media playlist to an away mode, according to an exemplary embodiment.

FIG. 5 is a flowchart of a process for setting a media playlist to an away mode, according to an exemplary embodiment. In step 501, the playlist manager platform 113 receives input from the user designating an away mode for any or all of the user's playlists (step 501). In response, the playlist manager platform 113 sets the playlist or playlists to an away mode according to the user's input (step 503). As previously discussed with respect to FIG. 2, the away mode directs the playlist manager platform 113 to initiate automatic recording of all broadcast media content in the playlist on the user's media device (e.g., STBs 115a-115b, end terminals 117-121) (step 505). In this way, the user may watch the playlist at a more convenient time.

Figure 6:
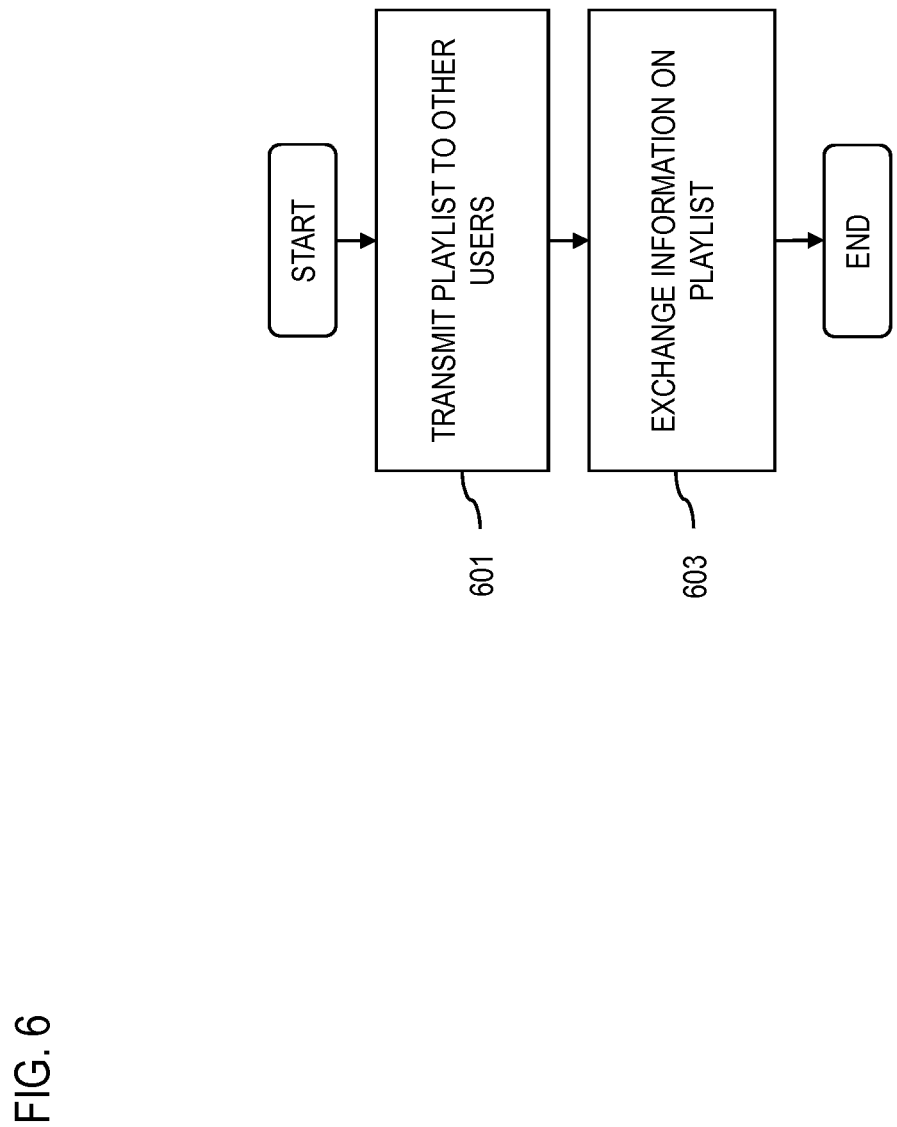
FIG. 6 is a flowchart of a process for transmitting a media playlist to other users and exchanging information regarding the media playlist, according to an exemplary embodiment.

FIG. 6 is a flowchart of a process for transmitting a media playlist to other users and exchanging information regarding the media playlist, according to an exemplary embodiment. In step 601, the playlist manager platform 113 transmits a playlist to one or more other users designated by the user. The playlist manager platform 113 may transmit the playlist directly to the users using the service provider's communication system. As with the synchronization function discussed with respect to FIG. 5, it is contemplated that any type of authentication process (e.g., user name and password, key access number, unique machine identifier (e.g., MAC address), biometric identifier) can be employed to ensure that the playlist is transmitted only to authorized users. In one embodiment, the playlist manager platform 113 can also leverage the resources of the social networking platform 125 to enable a user to share playlists across the system 100. After sharing the playlist, the playlist manager platform 113 may exchange information (e.g., comments, suggestions, and/or other similar interactions) among the recipients of the playlist (step 603). It is contemplated that this information may be received directly over the service provider's communication system or from external online social networks.

Figure 7:
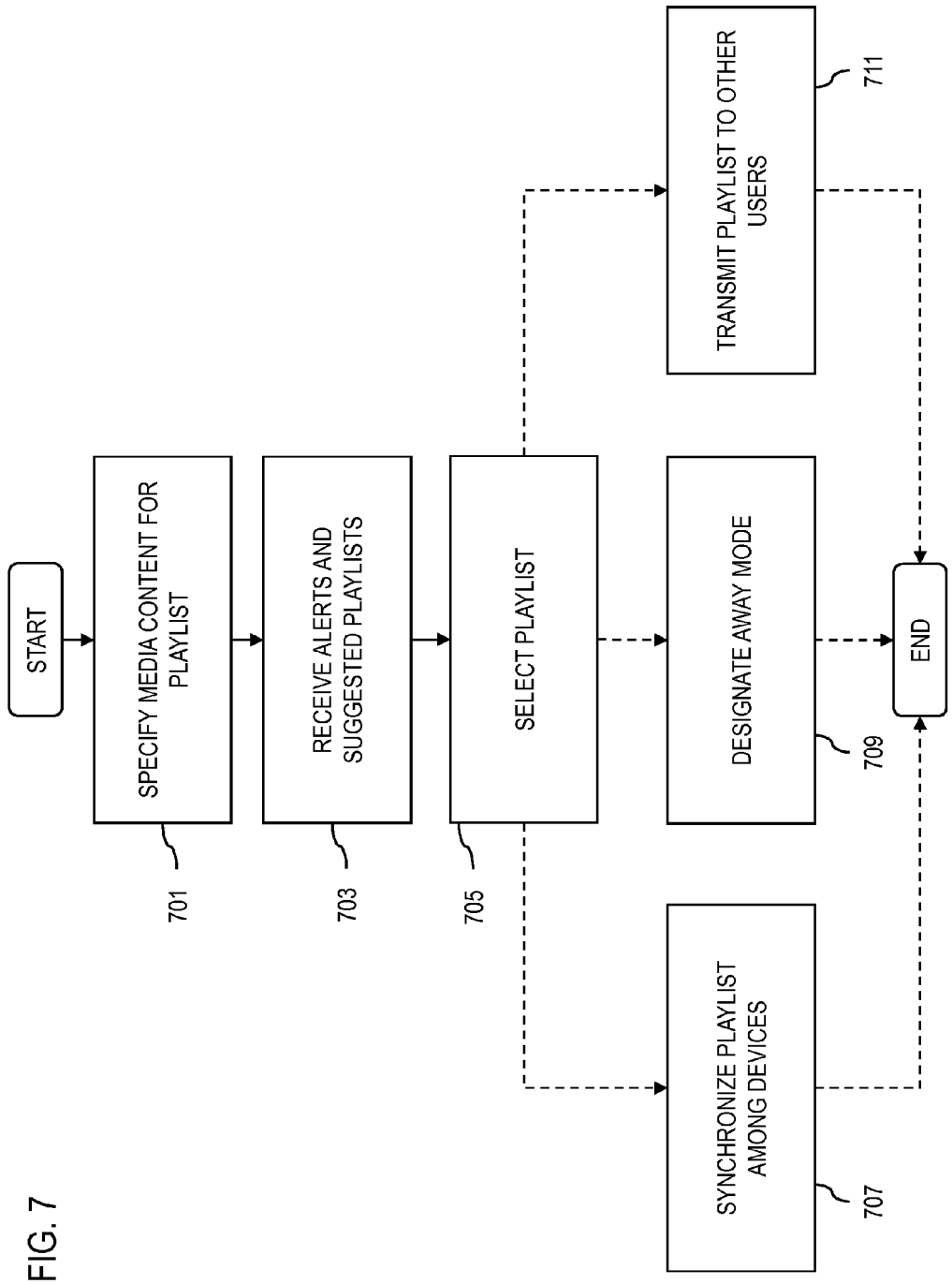
FIG. 7 is a flowchart of a process for creating a media playlist from a user's perspective, according to an exemplary embodiment.

FIG. 7 is a flowchart of a process for creating a media playlist from a user's perspective, according to an exemplary embodiment. This process is described with respect to an exemplary user interface of FIGS. 8A-8E. In step 701, the user specifies selection information regarding media content to include in a playlist. More specifically, the user may specify a name for the playlist and identify the desired media content using the process as described with respect to FIG. 3. The user then may receive an alert from the playlist manager platform 113 notifying the user of any scheduling conflicts among the desired media content and providing suggested alternate playlists to overcome the conflicts (step 703).

Figure 8A:
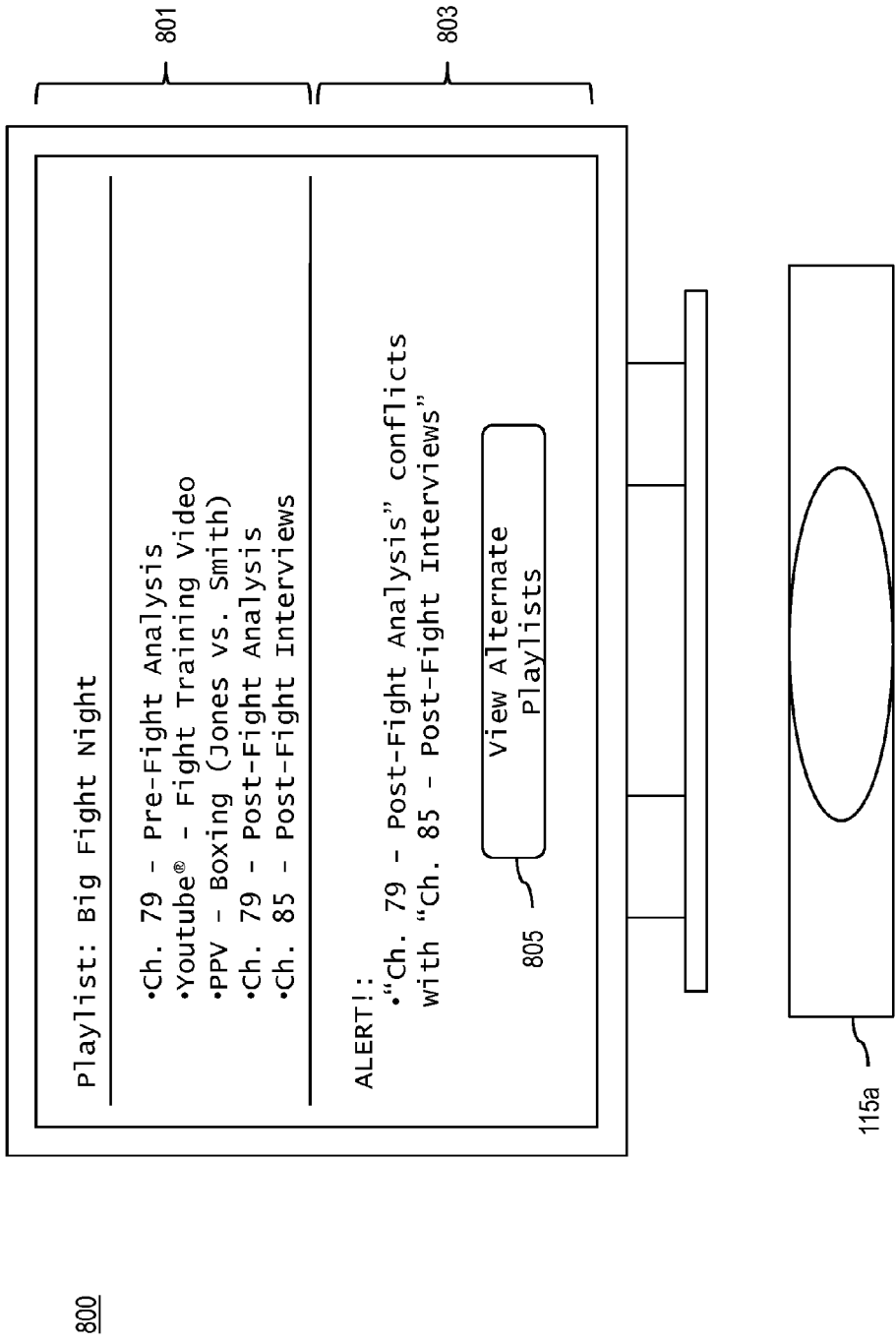
Figure 8C:

FIG. 8A depicts user interface screen 800 wherein STB 115a displays the playlist 801 as requested by the user and an alert 803 of any scheduling conflicts. In this example, alert 803 notifies the user that "Ch. 79—Post-Fight Analysis" conflicts with "Ch. 85—Post-Fight Interviews." The user may then view alternate playlists to overcome the scheduling conflict by selecting, for instance, button 805. FIG. 8B depicts a user interface screen 820 wherein STB 115a displays alternate playlists 821 and 823 that are available to the user. In alternate playlist 821, the playlist manager platform 113 has recommended recording "Ch. 85—Post-Fight Interviews" and watching it after "Ch. 79—Post-Fight Analysis" to resolve the identified scheduling conflict. In alternate playlist 823, the playlist manager platform 113 has recommended recording "Ch. 79—Post-Fight Analysis" and watching it after "Ch. 85—Post-Fight Interviews." The user may select alternate playlist 821 by selecting button 825 or alternate playlist 823 by selecting button 827 (step 705). FIG. 8C depicts a user interface screen 840 presenting a third alternate playlist 841 in which the "Ch. 85—Post-Fight Interviews" is also available online and the platform 103 has suggested viewing the "Ch. 85—Post-Fight Interviews" as an online stream rather than as a broadcast program. Alternate playlist 841 avoids the need to record one of the conflicting programs by suggesting an alternate viewing medium (i.e., online via the Internet). The user may select alternate playlist 841 by selecting button 843.

Figure 8D:
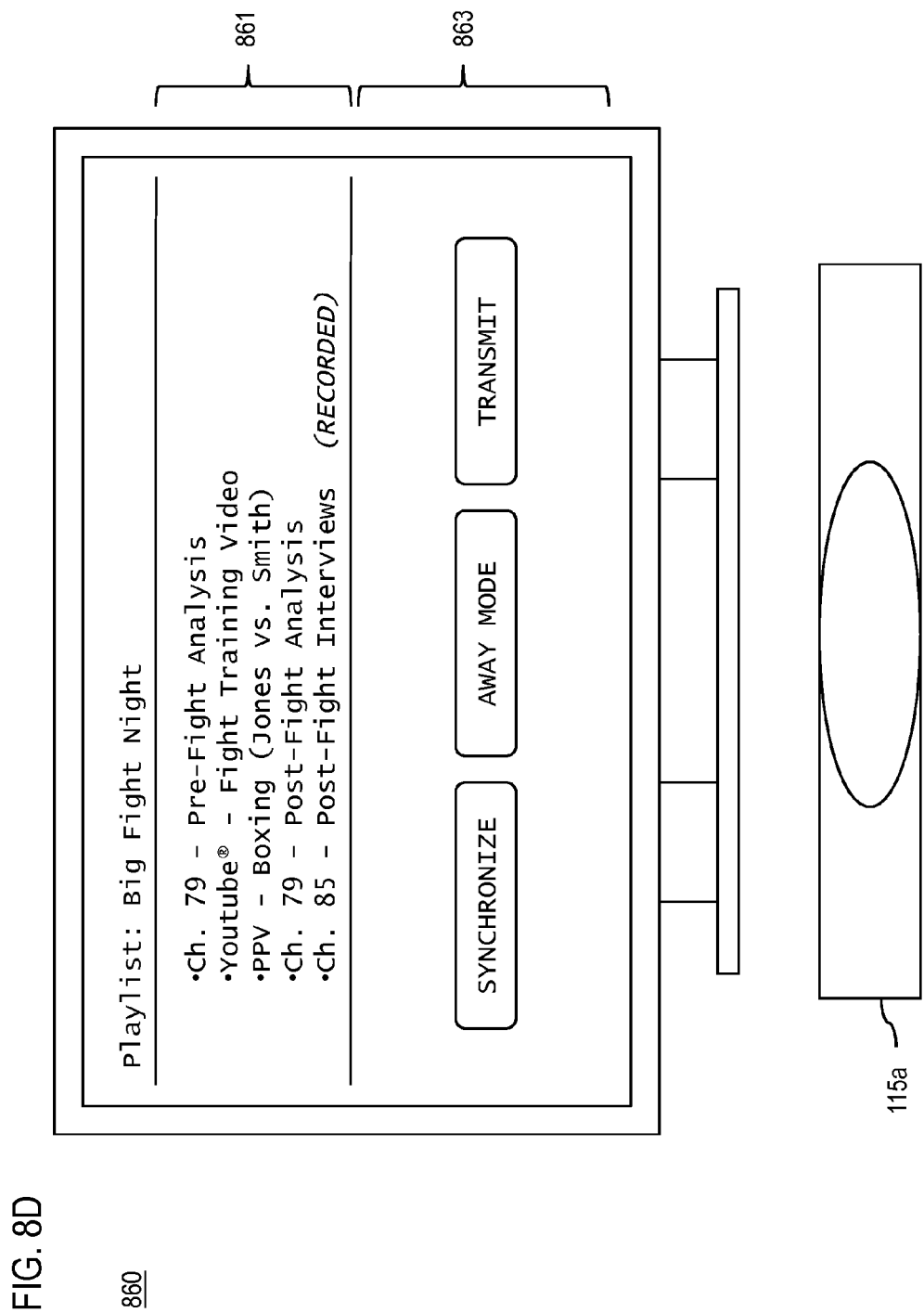
Figure 8E:
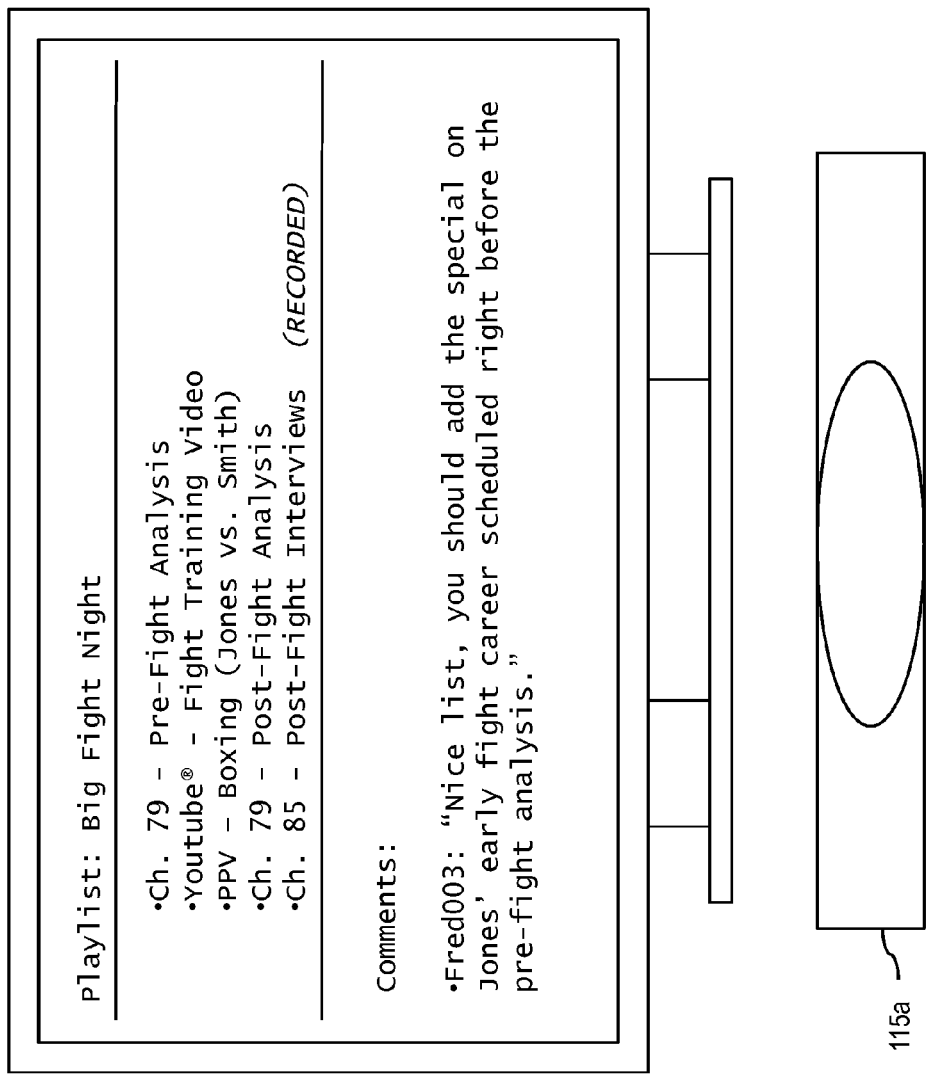

After making a selection, the user may choose, for instance, to synchronize the playlist among the user's set of devices (step 707), designate an away mode for the playlist (step 709), and/or transmit the playlist to other users for sharing and comment (step 711). FIG. 8D depicts a user interface screen 860 wherein STB 115a displays the selected playlist 861 along with the available playlist commands 863. In this example, the user selects to transmit the playlist to a group of friends and receives a comment from one recipient. FIG. 8E depicts a user interface screen 880 wherein STB 115a displays the user's selected playlist 861 and a comment 881 received from a friend, Fred003, stating "Nice list" and making a recommendation that "you should add the special on Jones' early fight career scheduled right before the pre-fight analysis." In this way, the user can leverage similar interests from a group of friends to identify and schedule media content of interest.

The processes described herein for creating media playlist may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
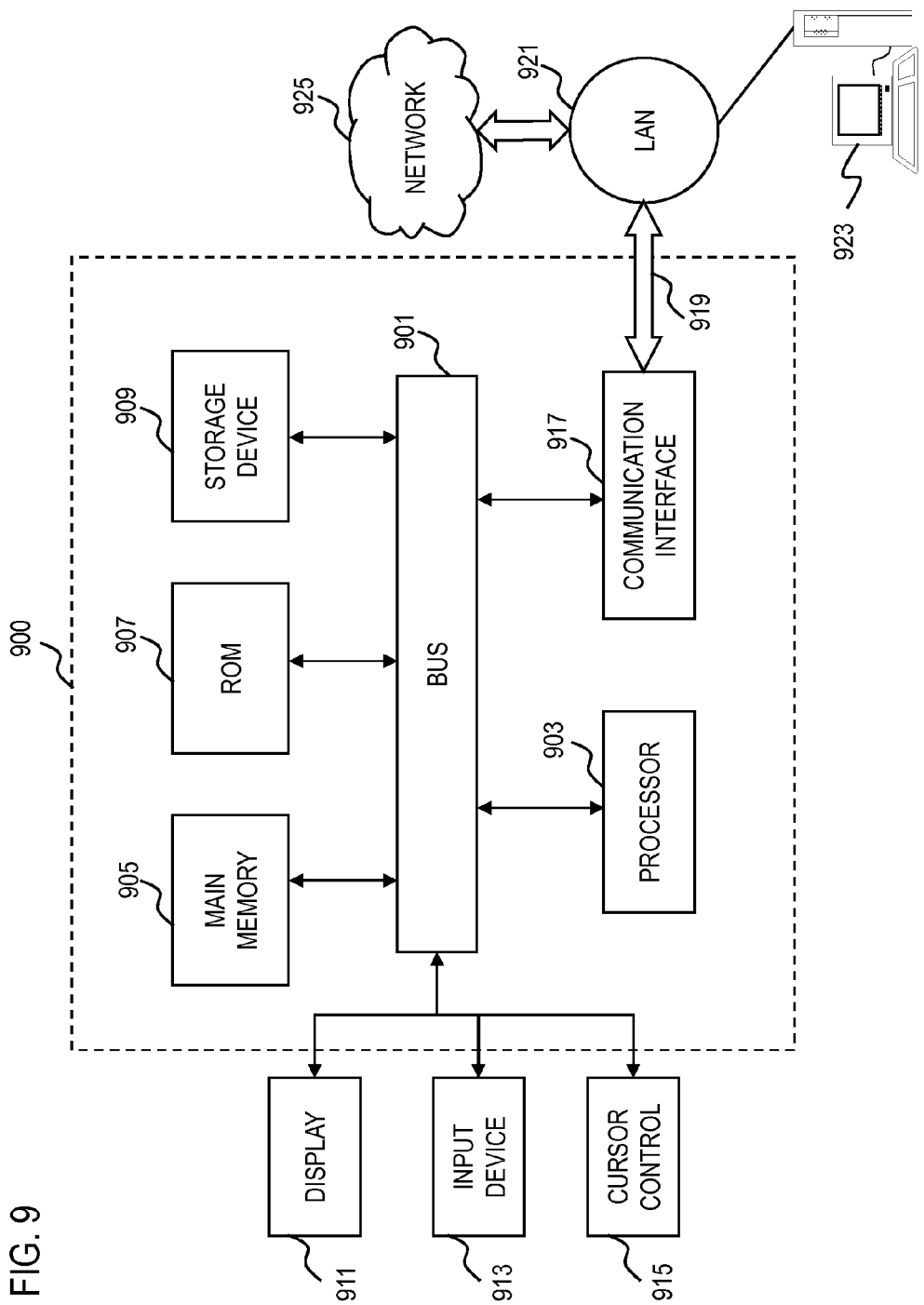
FIG. 9 is a diagram of a computer system that can be used to implement various exemplary embodiments.

FIG. 9 illustrates computing hardware (e.g., computer system) upon which an embodiment according to the invention can be implemented. The computer system 900 includes a bus 901 or other communication mechanism for communicating information and a processor 903 coupled to the bus 901 for processing information. The computer system 900 also includes main memory 905, such as random access memory (RAM) or other dynamic storage device, coupled to the bus 901 for storing information and instructions to be executed by the processor 903. Main memory 905 also can be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to an embodiment of the invention, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the invention. Thus, embodiments of the invention are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Model (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an embodiment of the invention through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   receiving at a playlist manger platform, selection information regarding media content for a media playlist, wherein the media playlist covers a plurality of different time periods and the media content for the media playlist is retrieved from a plurality of content sources;
   after receiving all selection information at the playlist manager platform for the media playlist covering the plurality of different time periods, determining at the playlist manger platform, whether a scheduling conflict exists for any of the media content of the media playlist;
   creating at the playlist manger platform, the media playlist for a user based on all the selection information and a determination made as to whether the scheduling conflict exists; and
   synchronizing the media playlist among a set of devices, each of which processes audio-video signals for presentation to the user, by transmitting the media playlist to each device in the set of devices, wherein
   the playlist manger platform resides on a network side, remote from the set of devices,
   the media playlist comprises a list of media content that is to be played or viewed in a designated time period,
   the media playlist has a standard mode and an away mode, and in the standard mode, a first portion of the media content of the media playlist is a broadcast media content that the user plays or views at a time that the media content is broadcast by a content source of the media content, and a second portion of the media content of the media playlist is a broadcast media content that the user plays or views at a time that is different from when the media content is broadcast by the content source of the media content,
   progress through the playlist by the user is tracked and synchronized among the set of devices, and
   the set of devices that the media playlist is synchronized among are devices of the user for which the media playlist is created and include devices by which the user plays or views the broadcast media of the media playlist at the time that the media content is broadcast by the content source of the media content.

2. A method of claim 1, further comprising:
   alerting the user of the scheduling conflict for any of the media content of the media playlist; and
   suggesting one or more alternate media playlists to overcome the scheduling.

3. A method of claim 1, wherein the media content includes broadcast content, on-demand content, digital video recorder (DVR) content, pay-per-view content, Internet Protocol Television (IPTV) content, Internet-based content, audio content, and image content.

4. A method of claim 1, further comprising:
   presenting the media content, to the user via a device, according to the media playlist, wherein the device includes at least one of a computing device, a mobile device, and a set-top box.

5. A method of claim 1, further comprising:
   scheduling a recording of conflicting media content for later viewing;
   scheduling an alternate viewing time for the conflicting media content; or
   suggesting an alternate viewing medium for the conflicting media content.

6. A method of claim 1, further comprising:
   monitoring the user's progress through the media playlist on a first one of the devices; and
   continuing the media playlist on a second one of the devices.

7. A method of claim 1, further comprising:
   receiving input from the user for designating the media playlist in the away mode to record any broadcast media content included in the media playlist.

8. An apparatus comprising:
   an input interface configured to receive selection information regarding media content for a media playlist, wherein the media playlist covers a plurality of different time periods and the media content for the media playlist is retrieved from a plurality of content sources;
   at least one processor; and
   at least one memory including computer program code,
   the at least one memory and the computer program code configured to, with the at least one processor, cause the apparatus to perform at least the following:
      after receiving all selection information for the media playlist covering the plurality of different time periods, determine whether a scheduling conflict exists for any of the media content of the media playlist;
      create the media playlist for a user based on the selection information and a determination made as to whether the scheduling conflict exists; and synchronize the media playlist among a set of devices, each of which processes audio-video signals for presentation to the user, by transmitting the media playlist to each device in the set of devices, wherein the apparatus resides on a network side, remote from the set of devices, the media playlist comprises a list of media content that is to be played or viewed in a designated time period, the media playlist has a standard mode and an away mode, and in the standard mode, a first portion of the media content of the media playlist is a broadcast media content that the user plays or views at a time that the media content is broadcast by a content source of the media content, and a second portion of the media content of the media playlist is a broadcast media content that the user plays or views at a time that is different from when the media content is broadcast by the content source of the media content, progress through the playlist by the user is tracked and synchronized among the set of devices, and the set of devices that the media playlist is synchronized among are devices of the user for which the media playlist is created and include devices by which the user plays or views the broadcast media of the media playlist at the time that the media content is broadcast by the content source of the media content.

9. An apparatus of claim 8, wherein the apparatus is further caused to:

alert the user of the scheduling conflict for any of the media content of the media playlist, and suggest one or more alternate media playlists to overcome the scheduling conflict.

10. An apparatus of claim 8, wherein the media content includes broadcast content, on-demand content, digital video recorder (DVR) content, pay-per-view content, Internet Protocol Television (IPTV) content, Internet-based content, audio content, and image content.

11. An apparatus of claim 8, wherein the apparatus is further caused to:

present the media content, to the user via a device, according to the media playlist, wherein the device includes at least one of a computing device, a mobile device, and a set-top box.

12. An apparatus of claim 8, wherein to determine whether a scheduling conflict exists includes to schedule a recording of the conflicting media content for later viewing, schedule an alternate viewing time for the conflicting media content, or suggest an alternate viewing medium for the conflicting media content.

13. An apparatus of claim 8, wherein the apparatus is further caused to:

monitor the user's progress through the media playlist on a first one of the devices, and continue the media playlist on a second one of the devices.

14. An apparatus of claim 8, wherein the apparatus is further caused to:

receive input from the user for designating the media playlist in the away mode to record any broadcast media content included in the media playlist.

15. A system comprising:

a nontransitory playlist manager configured to:

receive selection information regarding media content for a media playlist, wherein the media playlist covers a plurality of different time periods and the media content for the media playlist is retrieved from a plurality of content sources;

after receiving all selection information at the playlist manager for the media playlist covering the plurality of different time periods, determine whether a scheduling conflict exists for any of the media content of the media playlist;

create the media playlist for a user based on the selection information and a determination made as to whether the scheduling conflict exists; and synchronize the media playlist among a set of devices, each of which processes audio-video signals for presentation to the user, by transmitting the media playlist to each device in the set of devices, wherein the nontransitory playlist manager resides on a network side, remote from the set of devices, the media playlist comprises a list of media content that is to be played or viewed in a designated time period, the media playlist has a standard mode and an away mode, and in the standard mode, a first portion of the media content of the media playlist is a broadcast media content that the user plays or views at a time that the media content is broadcast by a content source of the media content, and a second portion of the media content of the media playlist is a broadcast media content that the user plays or views at a time that is different from when the media content is broadcast by the content source of the media content, progress through the playlist by the user is tracked and synchronized among the set of devices, and the set of devices that the media playlist is synchronized among are devices of the user for which the media playlist is created and include devices by which the user plays or views the broadcast media of the media playlist at the time that the media content is broadcast by the content source of the media content.

16. A system of claim 15, wherein the playlist manager is further configured to:

alert the user of the scheduling conflict for any of the media content of the media playlist, and suggest one or more alternate media playlists to overcome the scheduling conflict.

17. A system of claim 15, wherein the media content includes broadcast content, on-demand content, digital video recorder (DVR) content, pay-per-view content, Internet Protocol Television (IPTV) content, Internet-based content, audio content, and image content.

18. A system of claim 15, wherein the playlist manager is further configured to present the media content, to the user via a device, according to the media playlist, wherein the device includes at least one of a computing device, a mobile device, and a set-top box.

19. A system of claim 15, wherein the playlist manager is further configured to monitor the user's progress through the media playlist on a first one of the devices, and to continue the media playlist on a second one of the devices.

20. A system of claim 15, wherein the playlist manager is further configured to receive input from the user for designating the media playlist in the away mode to record any broadcast media content included in the media playlist.

21. A method of claim 1, further comprising:

transmitting the media playlist to one or more other users with common interests.

22. A method of claim 21, wherein the users exchange information among each other regarding the media playlist.

23. An apparatus of claim 8, wherein the apparatus is further caused to:

transmit the media playlist to one or more other users with common interests.

24. An apparatus of claim 23, wherein the apparatus is further caused to:
 exchange information among the users regarding the media playlist.

25. A system of claim 15, wherein the playlist manager is further configured to transmit the media playlist to one or more other users and exchange information among the users regarding the media playlist.

* * * * *